United States Patent
Athalye (10) Patent No.: US 8,532,699 B2
(45) Date of Patent: Sep. 10, 2013

(54) METHOD FOR POWER EFFICIENT ACTIVATION OF AN INACTIVE COMMUNICATION INTERFACE IN A MOBILE STATION HAVING MULTIPLE COMMUNICATION INTERFACES

(75) Inventor: Sanjeev Arvind Athalye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1033 days.

(21) Appl. No.: 11/524,349

(22) Filed: Sep. 19, 2006

(65) Prior Publication Data
US 2008/0070566 A1 Mar. 20, 2008

(51) Int. Cl.
*H04M 1/00* (2006.01)

(52) U.S. Cl.
USPC ........ 455/552.1; 455/428; 455/425; 455/436; 455/442; 455/553.1

(58) Field of Classification Search
USPC ............... 455/428, 425, 553.1, 552.1, 436, 455/442, 445; 713/324
See application file for complete search history.

(56) References Cited

U.S. PATENT DOCUMENTS

| | | | |
|---|---|---|---|
| 5,794,148 A * | 8/1998 | Mamaghani et al. | 455/435.3 |
| 6,185,422 B1 * | 2/2001 | Mattila | 455/434 |
| 6,185,435 B1 | 2/2001 | Imura | |
| 6,335,922 B1 * | 1/2002 | Tiedemann et al. | 370/335 |
| 6,393,006 B1 | 5/2002 | Kajihara | |
| 6,801,777 B2 | 10/2004 | Rusch | |
| 7,054,634 B2 | 5/2006 | Watanabe et al. | |
| 7,117,008 B2 | 10/2006 | Bajikar | |
| 7,180,876 B1 | 2/2007 | Henry et al. | |
| 7,266,389 B2 | 9/2007 | Karaoguz et al. | |
| 7,434,076 B1 * | 10/2008 | Altounian et al. | 713/324 |
| 7,508,782 B2 | 3/2009 | Morimoto | |

(Continued)

FOREIGN PATENT DOCUMENTS

| | | |
|---|---|---|
| EP | 1496719 | 1/2005 |
| EP | 1496719 A1 | 1/2005 |

(Continued)

OTHER PUBLICATIONS

ETSI TS 125 211 v7.0.0; "Universal Mobile Telecommunications System (UMTS): Physical Channels and mapping of transport channels onto physical channels (FDD)", 3GPP TS 25.211 version 7.0.0 Release 7 (Mar. 2006).

(Continued)

*Primary Examiner* — Manpreet Matharu
(74) *Attorney, Agent, or Firm* — Rupit M. Patel (57) ABSTRACT

A method of providing communication services for a mobile station having a plurality of communication interfaces is disclosed. Each communication interface has an active power mode and an inactive power mode. In the method, a communication service level is assessed for an active first communication interface. A second communication interface is activated and a communication service level is assessed for the activated second communication interface. A comparison is performed of the communication service levels of the first and second communication interfaces. If the second communication interface can provide a greater communication service level, then the first communication interface is deactivated by changing the first communication interface from the active power mode to the inactive power mode, and a communication service is provided through the second communication interface. Otherwise, a communication service is continued through the first communication interface.

16 Claims, 4 Drawing Sheets

(56) References Cited

U.S. PATENT DOCUMENTS

| | | | |
|---|---|---|---|
| 2003/0100308 A1* | 5/2003 | Rusch | 455/445 |
| 2003/0125019 A1 | 7/2003 | Bajikar | |
| 2004/0204175 A1* | 10/2004 | Karaoguz et al. | 455/572 |
| 2005/0009530 A1 | 1/2005 | Rouffet et al. | |
| 2005/0059395 A1 | 3/2005 | Park | |
| 2005/0078633 A1 | 4/2005 | Watanabe et al. | |
| 2005/0190711 A1 | 9/2005 | Morimoto | |
| 2005/0239443 A1 | 10/2005 | Watanabe et al. | |
| 2005/0255878 A1* | 11/2005 | Leinonen et al. | 455/552.1 |
| 2006/0116127 A1* | 6/2006 | Wilhoite et al. | 455/442 |
| 2006/0178147 A1* | 8/2006 | Jagadeesan et al. | 455/436 |
| 2007/0297373 A1 | 12/2007 | Saifullah et al. | |
| 2008/0080419 A1 | 4/2008 | Cole | |
| 2008/0167090 A1 | 7/2008 | Athalye | |

FOREIGN PATENT DOCUMENTS

| | | |
|---|---|---|
| EP | 1613108 | 1/2006 |
| EP | 1613108 A1 | 1/2006 |
| EP | 1679917 | 7/2006 |
| EP | 1679917 A2 | 7/2006 |
| GB | 2320658 | 6/1998 |
| JP | 10164654 | 6/1998 |
| JP | 2002112347 A | 4/2002 |
| JP | 2002112347 A | 4/2002 |
| JP | 2003318765 A | 11/2003 |
| JP | 2003318765 A | 11/2003 |
| JP | 2005094772 A | 4/2005 |
| JP | 2005110072 A | 4/2005 |
| JP | 2005522087 A | 7/2005 |
| JP | 2005303465 A | 10/2005 |
| JP | 2005303465 A | 10/2005 |
| JP | 2005339141 A | 12/2005 |
| JP | 2005339141 A | 12/2005 |
| JP | 2006501773 A | 1/2006 |
| KR | 2006081962 | 7/2006 |
| TW | I268718 | 12/2006 |
| TW | I269549 | 12/2006 |
| WO | 03084095 | 10/2003 |
| WO | 2004032560 A1 | 4/2004 |
| WO | 2006096295 | 9/2006 |
| WO | 2006096295 A1 | 9/2006 |
| WO | 2008036608 | 3/2008 |

OTHER PUBLICATIONS

TIA/EIA/-95-B: "Mobile Station-Base Station Compatibility Standard for Dual-Mode Wideband Spread Spectrum Cellular System", Mar. 1999.

"On Demand Paging Using Bluetooth Radios on 802.11 Based Networks", Yuvraj Agarwal, Rajesh K. Gupta; CECS Technical Report #03-22; Jul. 2003.

http://www.bluesoleil.com/support/index.asp?topic=bluetooth_questions.

Written Opinion—PCT/US07/078661, International Searching Authority—European Patent Office, Jan. 29, 2008.

3GPP2-C.S0002-C v1.0, "Physical Layer Standard for cdma2000 Spread Spectrum Systems", (TR 45.5), Revision D, Sep. 2005.

ETSI Standards, Universal Mobile Telecommunications System (UMTS); Physical channels and mapping of transport channels onto physical channels (FDD), (3GPP TS 25.211 version 7.0.0 Release 7), Mar. 1, 2006, ETSI, Sophia Antipolis Cedex, France, XP014035547.

ETSI TS 125 212 v7.1.0; "Universal Mobile Telecommunications System (UMTS); Multiplexing and channel coding (FDD)", 3G TS 25.212 version 7.1.0 Release 7 (Jun. 2006).

ETSI TS 125 213 v7.0.0; "Universal Mobile Telecommunications System (UMTS); Spreading and modulation (FDD)", 3G TS 25.213 version 7.0.0 Release 7 (Mar. 2006).

ETSI TS 125 214 v7.1.0; "Universal Mobile Telecommunications System (UMTS); Physical layer procedures (FDD)", 3G TS 25.214 version 7.1.0 Release 7 (Jun. 2006).

http://www.bluesoleil.com/support/index.asp"topic=bluetooth_questions, Retrieved Online May 1, 2008.

International Preliminary Report on Patentability—PCT/US07/078661, The International Bureau of WIPO—Geneva, Switzerland, Mar. 24, 2009.

International Search Report—PCT/US2008/050531, International Search Authority—European Patent Office—Jun. 30, 2008.

International Search Report, PCT/US07/078661—International Search Authority—European Patent Office—Jan. 29, 2008.

Shiao-Li, T. et al: "Reducing idle mode power consumption of cellular/VoWLAN dual mode mobiles" Global Telecommunications Conference 2005. GLOBECOM '05. IEEE St. Loius, MO, USA Nov. 28-Dec. 2, 2005, Piscataway, NJ, USA, IEEE, vol. 5, Nov. 28, 2005, pp. 2902-2906, XP010879251.

Taiwan Search Report—TW097100901—TIPO—Jun. 16, 2011.

TIA/EIA/-95-B; "Mobile Station-Base Station Compatibility Standard for Dual-Mode Wideband Spread Spectrum Cellular System", Mar. 1999.

Written Opinion—PCT/US2008/050531, International Search Authority—European Patent Office—Jun. 30, 2008.

Yuvraj Agarwal, et al., "On Demand Paging Using Bluetooth Radios on 802.11 Based networks" Internet Citation Jul. 1, 2003, pp. 1-19, XP002555283 Retrieved from the Internet: URL:http://epr1nts.kfupm.edu.sa/54180/1/54 180.pdf>[retrieved on Nov. 13, 2009] Section IV; p. 9.

* cited by examiner

METHOD FOR POWER EFFICIENT ACTIVATION OF AN INACTIVE COMMUNICATION INTERFACE IN A MOBILE STATION HAVING MULTIPLE COMMUNICATION INTERFACES

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Typical mobile subscribers use a mobile station such as a mobile phone or a laptop to access the wireless communication system. A mobile station may have several communication interfaces that support differing media types or access techniques. Energy or power constraints may dictate that the mobile station's unused communication interfaces be deactivated. Existing techniques may require user intervention or coordination with a base station in order to reactivate an inactive communication interface. There is therefore a need in the art for a mobile station configured to employ techniques for efficiently reactivating an inactive communication interface.

SUMMARY

An aspect of the present invention may reside in a method of providing communication services for a mobile station having a plurality of communication interfaces. Each communication interface has an active power mode and an inactive power mode. The power consumption of a communication interface in the active power mode is greater than the power consumption of the communication interface in the inactive power mode. In the method, a communication service level is assessed for a first communication interface which is in the active power mode and is providing a communication service. A second communication interface is activated by changing the second communication interface from the inactive power mode to the active power mode. A communication service level is assessed for the activated second communication interface. A comparison is performed of the communication service level of the first communication interface with the communication service level of the activated second communication interface. If the comparison of communication service levels indicates that the second communication interface can provide a greater communication service level than the first communication interface, then the first communication interface is deactivated by changing the first communication interface from the active power mode to the inactive power mode, and a communication service is provided through the second communication interface. Otherwise, a communication service is continued to be provided through the first communication interface.

In a more detailed aspect, the mobile station may be capable of assessing a communication service level of a communication interface in the active power mode and the mobile station is incapable of assessing a communication service level of a communication interface in the inactive power mode. Further, the steps of activating a second communication interface, assessing a communication service level, and performing a comparison of the communication service level may be performed when the communication service level of the first communication interface drops below a predetermined threshold, or when the mobile station is within a predetermined geographic area. Additionally, the steps may be repeated at time periods determined only by the mobile station, or at time periods determined by communication link quality factors for communication links associated with the respective communication interfaces.

In an additional aspect, a third communication interface maybe activated by changing the third communication interface from the inactive power mode to the active power mode. A communication service level of the activated third communication interface may be assessed. A comparison may be performed of the communication service level of the first communication interface with the communication service level of the activated third communication interface. If the comparison of communication service levels indicates that the third communication interface can provide a greater communication service level than the first communication interface, then the first communication interface may be deactivated by changing the first communication interface from the active power mode to the inactive power mode. A communication service may be provided through the third communication interface.

In further more detailed aspects of the invention, the steps of activating the second communication interface and assessing a communication service level of the second communication interface may be performed concurrent with the steps of activating the third communication interface and assessing a communication service level of the third communication interface, or may be performed in an order determined by a history of the communication service level provided through the respective communication interface, or in an order determined by a prediction of the communication service level to provided through the respective communication interface.

Another aspect of the invention may reside in a mobile station having a control processor for performing the method steps. In more detailed aspects, the control processor may activate and assess a communication service level of second communication interface when the communication service level of the first communication interface drops below a predetermined threshold, or when mobile station is within a predetermined geographic area. Also, the control processor may repeatedly activate and assess a communication service level of second communication interface at fixed times periods determined only by the mobile station, or at time periods determined by communication link quality factors for communication links associated with the respective communication interfaces.

Similarly, an aspect may reside in a mobile station including a plurality of communication interfaces. Each communication interface may have an active power mode and an inactive power mode. The power consumption of a communication interface in the active power mode is greater than the power consumption of the communication interface in the inactive power mode. The mobile station may further include means for assessing a communication service level of a first communication interface which is in the active power mode and is providing a communication service, means for activating a second communication interface by changing the second communication interface from the inactive power mode to the active power mode, means for assessing a communication service level of the activated second communication interface, means for performing a comparison of the communication service level of the first communication interface with the communication service level of the activated second communication interface, and means for deactivating the first communication interface by changing the first communication interface from the active power mode to the inactive power mode and providing a communication service through the second communication interface if the comparison of communication service levels indicates that the second communication interface can provide a greater communication service level than the first communication interface.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
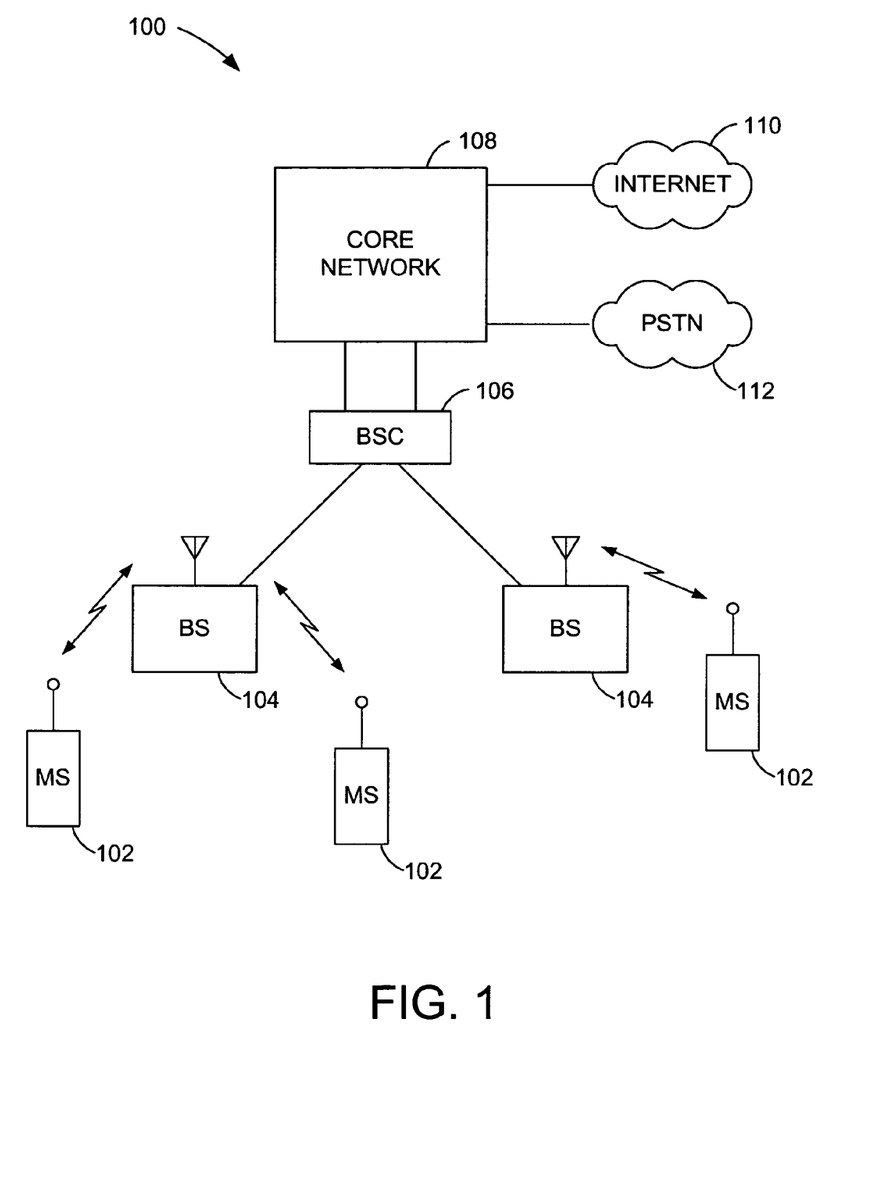
FIG. 1 is an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
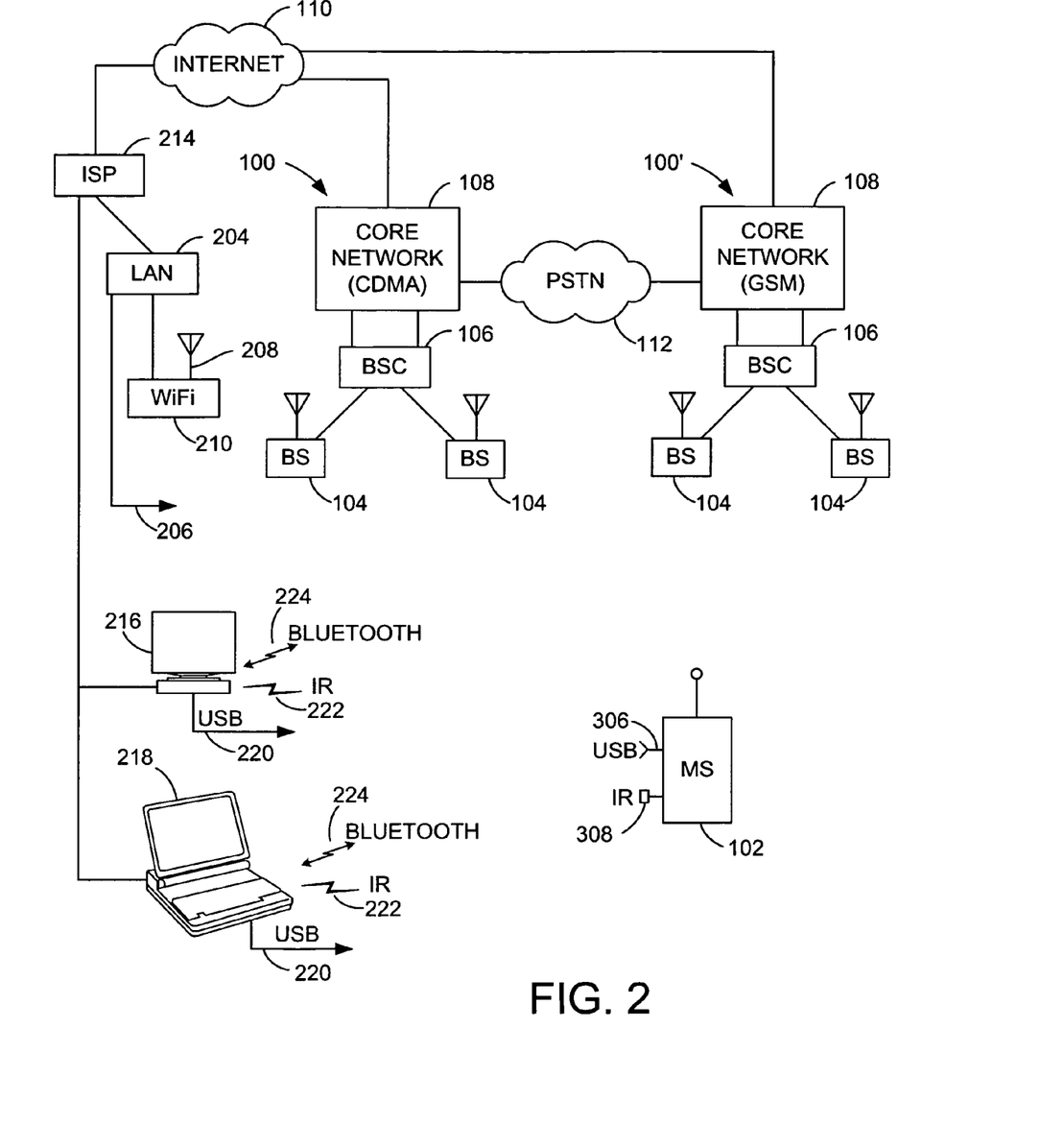
FIG. 2 is a block diagram of a mobile station having access to multiple access networks, in accordance with an aspect of the invention.

With reference to FIG. 2, a mobile subscriber may have access to multiple access networks that support differing media type or access techniques. More specifically, in addition to the wireless communication system 100 of FIG. 1, a mobile subscriber may have access to a local area network (LAN) 204 over a wired Ethernet connection 206, or over a wireless (WiFi) nework connection 208 through an access point 210 based on an IEEE 802.11 standard. The LAN may be connected to the Internet through, for example, an internet service provider (ISP) 214. Also, the mobile subscriber may have access to a personal computer (PC) 216, or a laptop computer 218, having a Universal Serial Bus (USB) connection 220, an infrared (IR) connection 222, or a Bluetooth connection 224.

Also, the mobile subscriber may have access to another wireless communication system 100'. For example, a first communication system 100 may be based on the CDMA multiple access technique, and a second wireless communication system 100' may be based on the TDMA access technique, such as a Global System for Mobile Communications (GSM).

Figure 3:
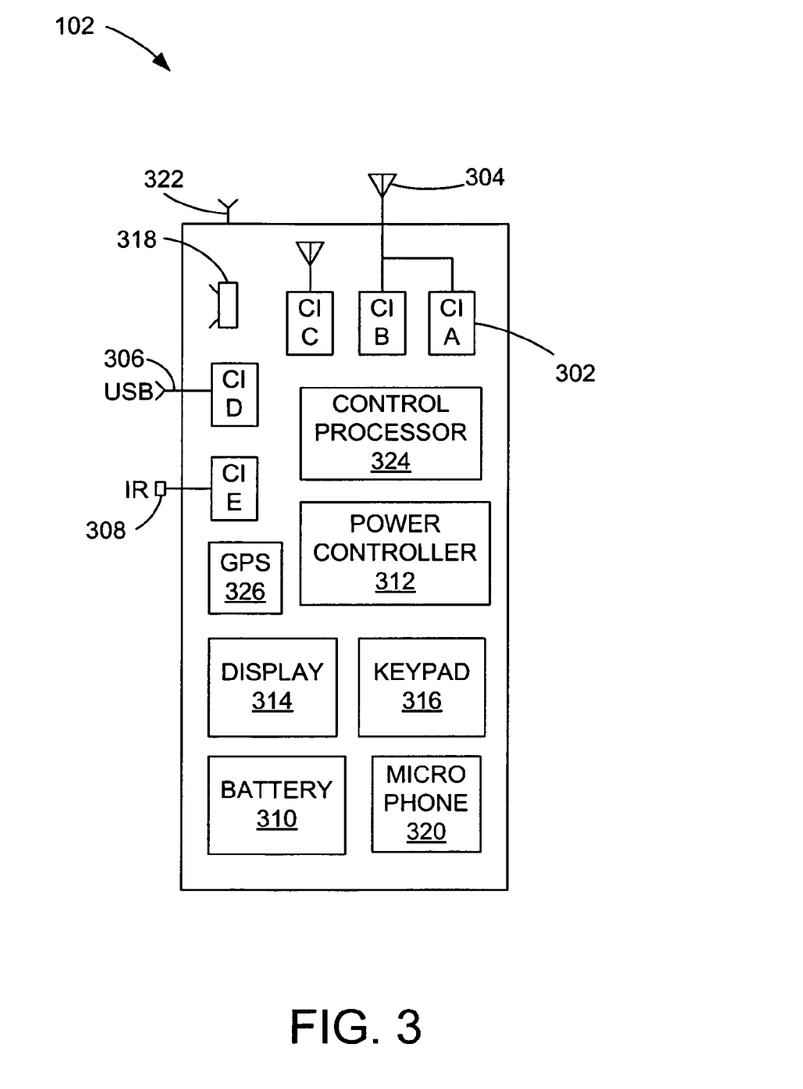
FIG. 3 is a block diagram of a mobile station having multiple communication interfaces, in accordance with an aspect of the invention.

With reference to FIG. 3, the mobile station 102 may have several communication interfaces (CI) 302. More specifically, the mobile station may have a communication interface A for communication with the CDMA-based wireless communication system 100, and another communication interface B for communication with the GSM-based wireless communication system 100'. These two communication interfaces may share a common antenna 304, or may have separate antennas (not shown). Also, the mobile station may have a communication interface C for communication with the WiFi access point 210, or with a Bluetooth connection 224. Further, the mobile station may have a communication interface D with a plug 306 for a direct wired connection through the Ethernet connection 206, or through the USB connection 220. Additionally, the mobile station may have a communication interface E for communication using an infrared (IR) optical transceiver 308.

The mobile station 102 has an internal battery 310 connected to a power control module 312. The power control module distributes the battery power to the communication interfaces 302. Each communication interface has an active mode in which full power is drawn from the battery, and an inactive mode in which little or no power is drawn from the battery. The mobile station also has a display 314, a keypad 316, a speaker 318, and a microphone 320. The mobile station may include a headphone jack 322. As the cost of memory decreases and processing power of a typical internal control processor 324 increases, more features and functions may be included in the mobile station. For example, the mobile station may be used to surf the World Wide Web, download and listen to music, download and view videos and movies, or determine geographic location using a Global Positioning Satellite (GPS) receiver 326.

Figure 4:
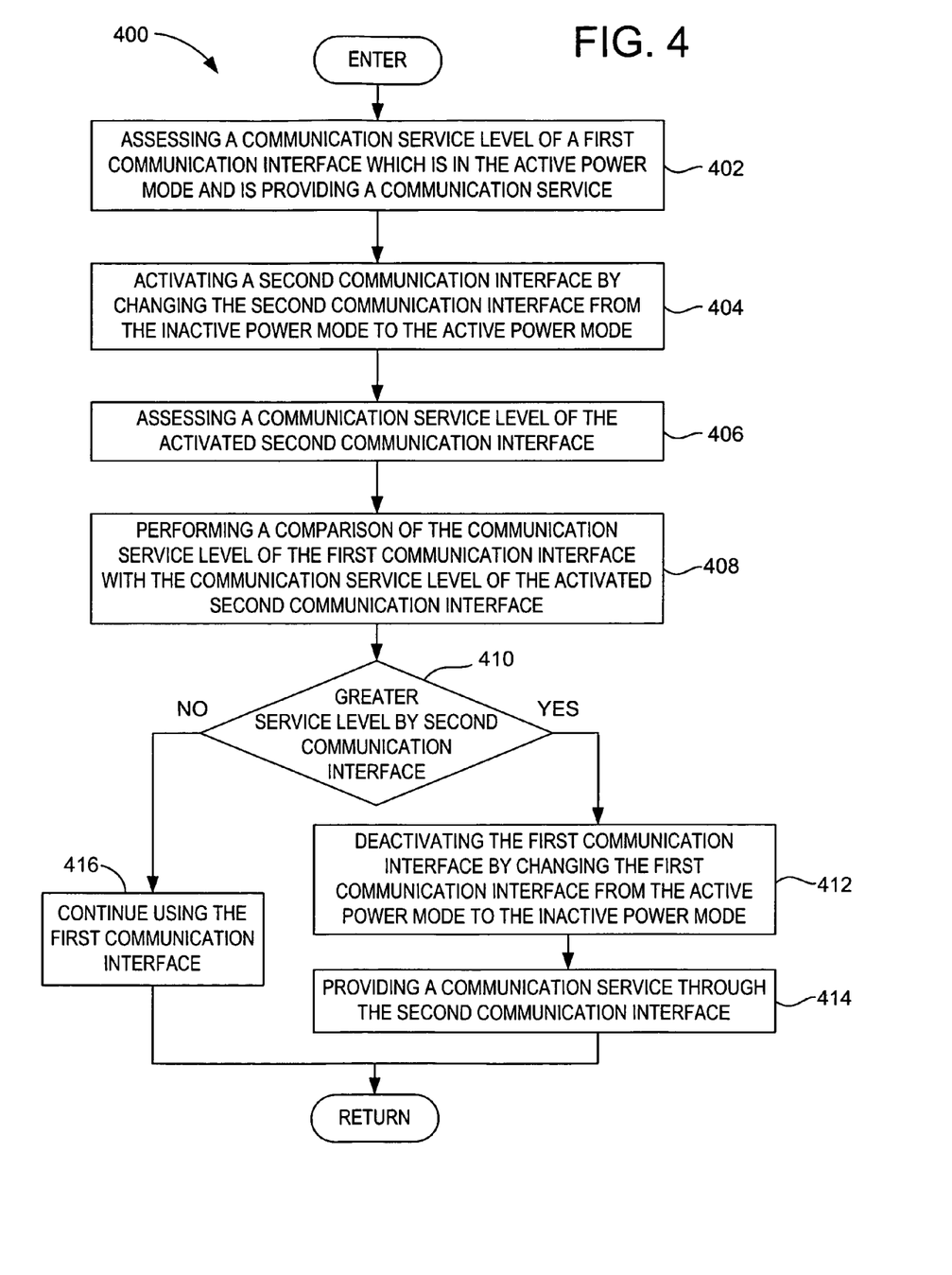
FIG. 4 is a flow diagram of a method for activating an inactive communication interface, in accordance with an aspect of the invention.

With reference to FIG. 4, one aspect of the present invention may reside in a method 400 of providing communication services for the mobile station 102 having a plurality of communication interfaces 302. Each communication interface has an active power mode and an inactive power mode. The power consumption of a communication interface in the active power mode is greater than the power consumption of the communication interface in the inactive power mode. In the method, a communication service level is assessed for a first communication interface which is in the active power mode and is providing a communication service (step 402). A second communication interface is activated by changing the second communication interface from the inactive power mode to the active power mode (step 404). A communication service level is assessed for the activated second communication interface (step 406). A comparison is performed of the communication service level of the first communication interface with the communication service level of the activated second communication interface (step 408). If the comparison of communication service levels indicates that the second communication interface can provide a greater communication service level than the first communication interface (step 410), then the first communication interface is deactivated by changing the first communication interface from the active power mode to the inactive power mode (step 412), and a communication service is provided through the second communication interface (step 414). Otherwise, a communication service is continued to be provided through the first communication interface (step 416).

The communication service level may be based on one of, or a combination of, traditional Quality of Service (QoS) metrics, radio frequency (rf) signal strength, financial cost, level of security provided, an explicit interface prioritization, and similar factors. Traditional QofS parameters are throughput, delay, jitter, packet error rate, and the like.

In a more detailed aspect, the mobile station 102 may be capable of assessing a communication service level of a communication interface 302 in the active power mode and the mobile station is incapable of assessing a communication service level of a communication interface in the inactive power mode. Further, the steps of activating a second communication interface, assessing a communication service level, and performing a comparison of the communication service level may be performed when the communication service level of the first communication interface drops below a predetermined threshold, or when the mobile station is within a predetermined geographic area. Additionally, the steps may be repeated at fixed times periods determined only by the mobile station, or at time periods determined by communication link quality factors for communication links associated with the respective communication interfaces.

In an additional aspect, a third communication interface 302 maybe activated by changing the third communication interface from the inactive power mode to the active power mode. A communication service level of the activated third communication interface may be assessed. A comparison may be performed of the communication service level of the first communication interface with the communication service level of the activated third communication interface. If the comparison of communication service levels indicates that the third communication interface can provide a greater communication service level than the first communication interface, then the first communication interface may be deactivated by changing the first communication interface from the active power mode to the inactive power mode. A communication service may be provided through the third communication interface.

In further more detailed aspects of the invention, the steps of activating the second communication interface 302 and assessing a communication service level of the seceond communication interface may be performed concurrent with the steps of activating the third communication interface and assessing a communication service level of the third communication interface, or may be performed in an order determined by a history of the communication service level provided through the respective communication interface, or in an order determined by a prediction of the communication service level to provided through the respective communication interface.

Another aspect of the invention may reside in a mobile station 102 having a control processor 324 for performing the method steps. In more detailed aspects, the control processor may activate and assess a communication service level of second communication interface when the communication service level of the first communication interface drops below a predetermined threshold, or when mobile station is within a predetermined geographic area. A knowledge of which media type are active in the geographic area or neighborhood of the mobile station may be obtained using neighbor lists that are provisioned in the mobile station, that are broadcast, or that are fetched offline. Also, the control processor may repeatedly activate and assess a communication service level of second communication interface at fixed times periods determined only by the mobile station, or at time periods determined by communication link quality factors for communication links associated with the respective communication interfaces. Other factors may include the time required for each communication interface to monitor the link quality, the cost in power as a function of the duration that the communication interface remains active, or the relative preference of usage of each communication interface.

Similarly, an aspect of the invention may reside in a mobile station 102 including a plurality of communication interfaces 302. Each communication interface may have an active power mode and an inactive power mode. The power consumption of a communication interface in the active power mode is greater than the power consumption of the communication interface in the inactive power mode. The mobile station may further include means for assessing a communication service level of a first communication interface which is in the active power mode and is providing a communication service, means for activating a second communication interface by changing the second communication interface from the inactive power mode to the active power mode, means for assessing a communication service level of the activated second communication interface, means for performing a comparison of the communication service level of the first communication interface with the communication service level of the activated second communication interface, and means for deactivating the first communication interface by changing the first communication interface from the active power mode to the inactive power mode and providing a communication service through the second communication interface if the comparison of communication service levels indicates that the second communication interface can provide a greater communication service level than the first communication interface. The means for assessing a communication service level, and the means for performing a comparison of the communication service level, each may suitably include the control processor 324. The means for activating, and the means for deactivating, each may suitably include the power control module 312.

A variety of systems, protocols, media, and communication interfaces may be used for the mobile station 102. An exemplary list includes: GSM, GPRS, EDGE, WCDMA, HSDPA, HSUPA, CDMA2000 1X, CDMA2000 1xEV-DO, IEEE 802.11, Bluetooth, RFID, UWB, Infrared, DVB-H, MediaFLO, IEEE 802.16, IEEE 802.20, Ethernet, USB, and wireless USB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of providing communication services for a mobile station having a plurality of communication interfaces, each communication interface having an active power mode and an inactive power mode wherein the power consumption of a communication interface in the active power mode is greater than the power consumption of the communication interface in the inactive power mode, the method comprising:

assessing a communication service level of a first communication interface which is in the active power mode and is providing a communication service;

activating a second communication interface independent of a quality of the first communication interface still in the active power mode when the mobile station is within a predetermined geographic area as determined separate from the second communication interface by the mobile station;

assessing a communication service level of the activated second communication interface;

performing a comparison of the communication service level of the first communication interface with the communication service level of the activated second communication interface; and if the comparison of communication service levels indicates that the second communication interface can provide a greater communication service level than the first communication interface, then:
- deactivating the first communication interface by changing the first communication interface from the active power mode to the inactive power mode; and
- providing the communication service through the second communication interface;
  - otherwise continue providing a communication service through the first communication interface.

2. A method of providing communication services for a mobile station as defined in claim 1, wherein the mobile station is capable of assessing a communication service level of a communication interface in the active power mode and the mobile station is incapable of assessing a communication service level of a communication interface in the inactive power mode.

3. A method of providing communication services for a mobile station as defined in claim 1, wherein the steps of activating a second communication interface, assessing a communication service level, and performing a comparison of the communication service level are repeated at fixed time periods determined only by the mobile station.

4. A method of providing communication services for a mobile station as defined in claim 1, wherein the steps of activating a second communication interface, assessing a communication service level, and performing a comparison of the communication service level are repeated at time periods determined by communication link quality factors for communication links associated with the respective communication interfaces.

5. A method of providing communication services for a mobile station as defined in claim 1, wherein the steps of assessing a communication service level, and performing a comparison of the communication service level are performed when the mobile station is within a predetermined geographic area.

6. A method of providing communication services for a mobile station as defined in claim 1, further comprising:
- activating a third communication interface by changing the third communication interface from the inactive power mode to the active power mode;
- assessing a communication service level of the activated third communication interface;
- performing a comparison of the communication service level of the first communication interface with the communication service level of the activated third communication interface; and
- if the comparison of communication service levels indicates that the third communication interface can provide a greater communication service level than the first communication interface, then:
  - deactivating the first communication interface by changing the first communication interface from the active power mode to the inactive power mode; and
  - providing a communication service through the third communication interface;
    - otherwise continue providing a communication service through the first communication interface.

7. A method of providing communication services for a mobile station as defined in claim 6, wherein the steps of activating the third communication interface and assessing a communication service level of the third communication interface are performed concurrent with the steps of activating second communication interface and assessing a communication service level of the third communication interface.

8. A method of providing communication services for a mobile station as defined in claim 6, wherein the steps of activating the third communication interface and assessing a communication service level of the third communication interface and the steps of activating second communication interface and assessing a communication service level of the third communication interface are performed in an order determined by a history of the communication service level provided through the respective communication interface.

9. A method of providing communication services for a mobile station as defined in claim 6, wherein the steps of activating the second communication interface and assessing a communication service level of the second communication interface and the steps of activating the third communication interface and assessing a communication service level of the third communication interface are performed in an order determined by a prediction of the communication service level to provided through the respective communication interface.

10. A mobile station comprising:
- a plurality of communication interfaces, each communication interface having an active power mode and an inactive power mode wherein the power consumption of a communication interface in the active power mode is greater than the power consumption of the communication interface in the inactive power mode;
- a control processor for:
  - assessing a communication service level of a first communication interface which is in the active power mode and is providing a communication service;
  - activating a second communication interface independent of a quality of the first communication interface still in the active power mode when the mobile station is within a predetermined geographic area as determined separate from the second communication interface by the mobile station;
  - assessing a communication service level of the activated second communication interface;
  - performing a comparison of the communication service level of the first communication interface with the communication service level of the activated second communication interface; and
  - if the comparison of communication service levels indicates that the second communication interface can provide a greater communication service level than the first communication interface, then:
    - deactivating the first communication interface by changing the first communication interface from the active power mode to the inactive power mode; and
    - providing the communication service through the second communication interface;
      - otherwise continue providing a communication service through the first communication interface.

11. A mobile station as defined in claim 10, wherein the mobile station is capable of assessing a communication service level of a communication interface in the active power mode and the mobile is incapable of assessing a communication service level of a communication interface in the inactive power mode.

12. A mobile station as defined in claim 10, wherein the control processor repeatedly activates and assesses a communication service level of second communication interface at fixed time periods determined only by the mobile station.

13. A mobile station as defined in claim 10, wherein the control processor repeatedly activates and assesses a communication service level of second communication interface at time periods determined by communication link quality factors for communication links associated with the respective communication interfaces.

14. A mobile station as defined in claim 10, wherein the control processor assesses a communication service level of second communication interface when mobile station is within a predetermined geographic area.

15. A mobile station comprising:
a plurality of communication interfaces, each communication interface having an active power mode and an inactive power mode wherein the power consumption of a communication interface in the active power mode is greater than the power consumption of the communication interface in the inactive power mode;
means for assessing a communication service level of a first communication interface which is in the active power mode and is providing a communication service;
means for activating a second communication interface independent of a quality of the first communication interface still in the active power mode when the mobile station is within a predetermined geographic area as determined separate from the second communication interface by the mobile station;
means for assessing a communication service level of the activated second communication interface;
means for performing a comparison of the communication service level of the first communication interface with the communication service level of the activated second communication interface; and
means for deactivating the first communication interface by changing the first communication interface from the active power mode to the inactive power mode and providing the communication service through the second communication interface if the comparison of communication service levels indicates that the second communication interface can provide a greater communication service level than the first communication interface.

16. A non-transitory machine readable medium comprising instructions, the instructions when executed by the machine, cause the machine to perform operations comprising:
assessing a communication service level of a first communication interface which is in an active power mode and is providing a communication service, wherein the first communication interface has the active power mode and an inactive power mode, and the power consumption of the first communication interface in the active power mode is greater than the power consumption of the first communication interface in the inactive power mode;
activating a second communication interface independent of a quality of the first communication interface still in the active power mode when the mobile station is within a predetermined geographic area as determined separate from the second communication interface by the mobile station;
assessing a communication service level of the activated second communication interface;
performing a comparison of the communication service level of the first communication interface with the communication service level of the activated second communication interface; and
if the comparison of communication service levels indicates that the second communication interface can provide a greater communication service level than the first communication interface, then:
deactivating the first communication interface by changing the first communication interface from the active power mode to the inactive power mode; and
providing the communication service through the second communication interface;
otherwise continue providing a communication service through the first communication interface.

\* \* \* \* \*